United States Patent [19]

Figueras

[11] Patent Number: 4,573,538
[45] Date of Patent: Mar. 4, 1986

[54] HORSE HOOF-SHOEING SOLE PLATE

[76] Inventor: Michel Figueras, Les Fuziers, 38540 Saint Just Chaleyssin, France

[21] Appl. No.: 669,953

[22] Filed: Nov. 9, 1984

[30] Foreign Application Priority Data

Nov. 14, 1983 [FR] France .................. 83 18250

[51] Int. Cl.$^4$ .......................... A01L 5/00; A01L 7/02
[52] U.S. Cl. ................................ 168/14; 168/28
[58] Field of Search .................. 168/11, 12, 14, 27, 168/28

[56] References Cited

U.S. PATENT DOCUMENTS

| | | | |
|---|---|---|---|
| 586,030 | 7/1897 | Hallanan | 168/28 |
| 594,080 | 11/1897 | Hennessy | 168/28 |
| 909,287 | 1/1909 | Dillon | 168/14 |
| 1,357,909 | 11/1920 | Sherwood | 168/28 |

FOREIGN PATENT DOCUMENTS

| | | | |
|---|---|---|---|
| 2459615 | 1/1981 | France . | |
| 187294 | 10/1922 | United Kingdom | 168/28 |
| 722583 | 1/1955 | United Kingdom | 168/27 |

Primary Examiner—Robert P. Swiatek
Attorney, Agent, or Firm—Bacon & Thomas

[57] ABSTRACT

A sole plate for attachment to the hoof of a horse by means of plural screws, the plate including a reinforcement frame, an integral casing enclosing the frame, with a portion of the casing defining a central unadhered zone with the frame, a hole formed in the frame for permitting access to the central zone, and a valve closing the hole for insertion of a needle therethrough to inject compressed fluid into the central zone and inflate a portion of the casing forming the bottom wear layer of the plate.

11 Claims, 9 Drawing Figures

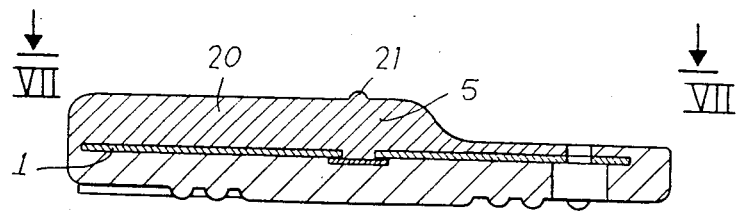
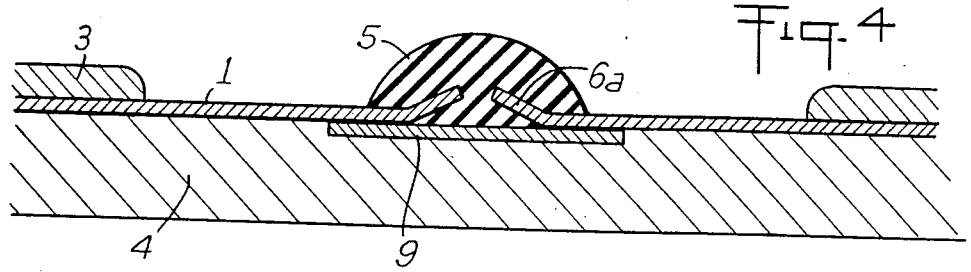
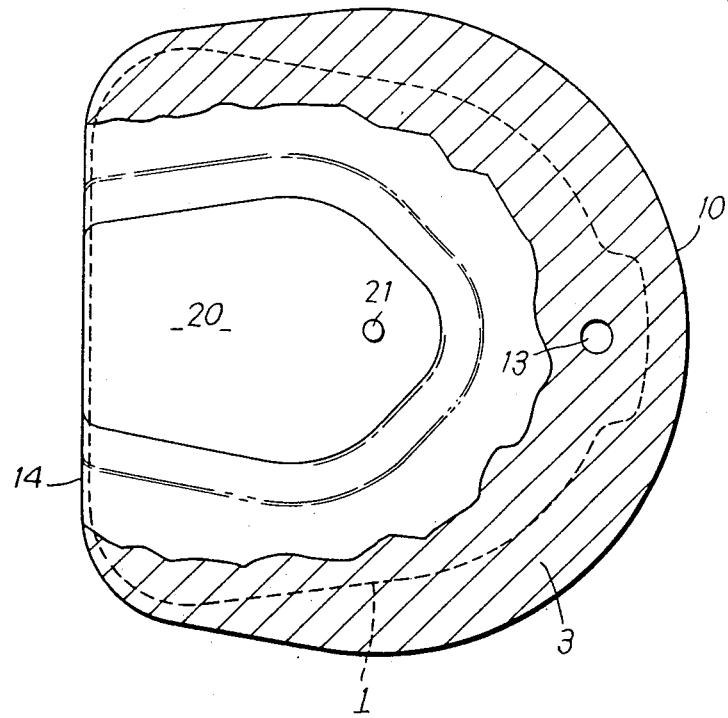

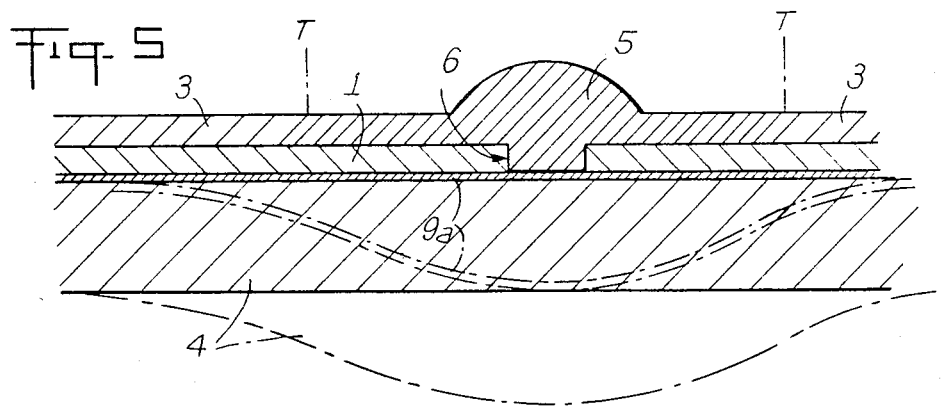
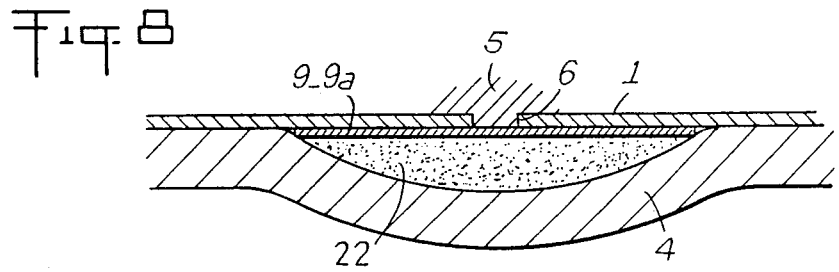
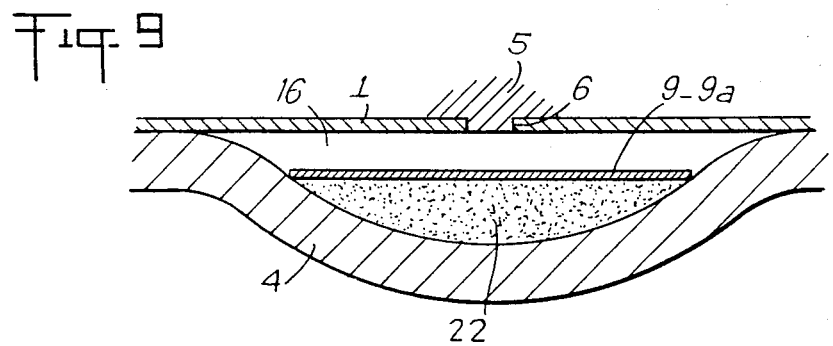

HORSE HOOF-SHOEING SOLE PLATE

This invention relates basically to equine equipment and specifically to hoof shoeing for horses.

As a consequence of their domestication, horses have been removed from their natural environment and made to walk on ever harder ground, even including artificial pavements of stone, aggregate or pre-mixed surfacing.

These various pavements impose great stresses on the horses' hooves resulting in damage to the horn, in various inflammations, collapses and joint disorders.

To obviate some of these disadvantages, methods have long been known of paring the hooves and fitting them with horseshoes designed to serve both as a wear part and a reinforcing frame preserving the hooves against splintering. The term horseshoe as used herein shall be understood to include shoes made of plastic as well as those made of metal.

Such shoes are not entirely adequate as they do not provide a good grip on the ground and hinder, rather than help, the filtering or damping of shocks from hoof-to-ground impact.

These drawbacks are manifest for horses used for draft, riding and racing, but are even greater for jumpers. In fact, the impact of the animal with the ground after clearing a barrier is a function of the speed, weight and height of fall. Repeated jumps on hard ground induce a general fatigue in horses and especially a fatigue in their joints which is detrimental to the development of their capabilities.

One attempt to remedy this drawback has been to equip the horses' hooves with an envelope or case secured between the shoe and the hoof and having a rear opening for insertion of an inflatable air bag. This is taught in particular by British patent No. 187 294.

In light of the real loads and stresses involved however, such an approach is entirely impractical, for the envelope or case as well as the bag or pneumatic pad can neither provide the required damping at impact, nor, even more importantly, prevent the impact between the shoe and the ground.

Another proposed solution, namely that taught in French patent No. 78-11 596 (2 422 330), consists in fitting conventional horseshoes with a sort of deformable pad. Again, however, in light of the stresses encountered in practice, such an approach fails to absorb the force of impact at the moment when the horse lands on the ground and besides fails to provide a sufficiently strong mechanical link between the conventional shoe and the pad insert.

A still further approach, disclosed in French patent application 82-21 963, would provide a pad or similar device consisting of a reinforcement with two layers of deformable material disposed about said reinforcement, on each side thereof, such as to form between said layers a compartment able to be inflated by means of a valve accessible from the periphery of the pad.

Although the last-mentioned approach can be deemed to contribute a novel teaching in relation to prior knowledge, it turns out that in practice, such a pad, which is easy enough to manufacture and implement, is not strong enough physically and is quickly destroyed after a short period of use.

Experience has shown that such pads are incapable, given their makeup, of withstanding the loads incident to the impact following the jumping of a barrier or inherent to galloping on hard ground. This is mainly due to the fact that the inflated pad is subjected to such extreme compression at the moment of hoof-to-ground contact that the deformable material of its walls becomes torn.

The present invention is accordingly directed to remedying the above-mentioned disadvantages by providing a novel sole plate for a horse hoof, in the particular form of a one-piece design or, more specifically a monobloc design, yet able to be locally inflated, so as to afford suitable strength for withstanding the stresses encountered in racing, galloping and/or barrier jumping (steeplechasing).

It is an object of the invention to provide a new sole plate the various parts whereof are intimately associated to form an especially rugged unit.

Another object of the invention is to provide a novel horse hoof sole plate fulfilling the practical functions of slip-proofing, damping and even restoring stored energy, without stressing the frog and/or the sensitive sole of the horse's hoof.

Yet another object of the invention is to provide a horse hoof sole plate featuring a compartment able to be inflated at will, or in other words, operable to be inflated to any desired pressure and/or deflated as required for different utilizations.

Still another object of the invention is to provide a new horsehoof sole plate affording, if need be, an orthopedic capability susceptible of resisting or compensating the collapse of the arch and/or the sole of the hoof, as well as of the frog thereof.

In order to achieve the foregoing objectives, the horse hoof sole plate according to the invention is given the following features:

a reinforcement plate;
a casing of said reinforcement plate made of a material having a Shore hardness in the range 45 to 100, made of one piece all around the plate and forming:
   at least a partial top layer adhering to the top of the plate,
   and a bottom or wear layer being intimately connected to the top layer throughout the periphery of the plate, adhering partially to the corresponding face in relation whereto said wear layer features a substantially central, non-adhering zone containing openings through which said plate can be seen and serving as a passage and bearing for the heads of fastening screws engaging into holes made according to need in said plate by working through said openings;
an area of material having a Shore hardness in the range 25 to 55, selected for its resilience or self-sealing ability in the event of puncturing and formed on the face opposite the wear layer to constitute a valve for an air pump needle;
and a hole made in line with the valve, in the part of said plate corresponding to the zone not adhering to said wear layer.

Various other features and advantages of the invention will become apparent from the description hereafter, made in reference to the appended drawings which illustrate, by way of non-limiting example, several alternative embodiments of the invention.

FIGS. 4 and 5 are partial, enlarged cross sections showing two alternative embodiments of the invention.

FIG. 6 is a cross-sectional elevation similar to FIG. 2 but depicting still another embodiment of the invention.

FIG. 7 is a plan view taken along line VII—VII of FIG. 6.

FIGS. 8 and 9 are two partial, cross-sectional elevations, enlarged to show another variant of the invention.

FIGS. 1 and 2 illustrate a first embodiment of the invention according to which the hoof sole plate comprises a reinforcement plate 1 consisting of a metal plate of uniform thickness. The plate conforms substantially to the overall shape in plan view of the sole plate except that it is smaller than the latter.

Plate 1, which is preferably a solid plate, is associated with a casing 2 made of a material having a Shore hardness in the 45 to 100 range, such as, for example, reinforced rubber. The casing 2 is made to form a top layer 3 and a bottom, wear layer 4, said two layers being intimately connected together throughout the periphery of the plate 1 which they surround. Casing 2 is fabricated in monobloc form, that is, made in one piece and by means of a single operation, to surround said plate 1.

Figure 2:
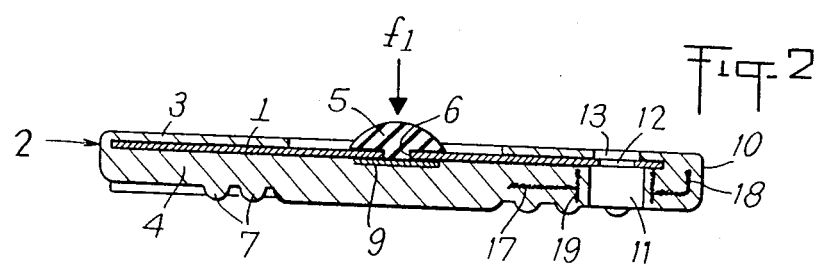
FIG. 2 is a cross-sectional elevation taken along line II—II of FIG. 1.

In the example illustrated in FIG. 2, the top layer 3 is relatively thin and only partially covers the corresponding face of the plate 1 to which it solidly adheres. Said layer 3 in this case leaves a center zone, or a substantially central zone free of material but nevertheless comprising a bulb, a projection or a dome-shaped head 5, whose substance is solidly bonded to the plate and fills a through hole 6 in plate 1. The bulb 5 is made of a resilient, plastic material selected for its self-sealability in the event of a puncture by a needle. Such a material can have a Shore hardness ranging from 25 to 55. Preferably, said bulb 5 and said hole 6 filling are of natural rubber in the 30–55 Shore hardness range.

The wear layer 4 is substantially thicker than the top layer 3 and is provided, on its face opposite the latter layer, with bumps or stampings 7 designed to impart an especially high adherence coefficient. In some cases, wear layer 4 can be made from a material having a different Shore hardness than that of top layer 3.

Alternatively, said layers 3 and 4 could both be made of polyurethane or elastomer.

An important feature of the invention is that layer 4 is solidly bonded to the corresponding face of plate 1 except in a substantially central zone 8 of said plate 1. In said zone 8, on the contrary, said layer 4 is entirely without adherence to the plate, thus leaving an interface including the cross section or aperture corresponding to hole 6.

Layer 4 is associated in the area of interface 8 with a flap 9 occupying a specific, stable position in front of the aperture or cross section of hole 6. Flap 9 is made of a material selected for its good resistance to puncturing and can be part of or bonded to layer 4, or merely cut out to be secured inside interface 8 by cooperation with the edges of the zone without adherence.

Layer 4 is made in such manner as to leave a passage 11 slightly behind the anterior part of the sole plate coinciding with a hole 12 in the plate 1 as well as with an opening 13 in layer 3. Layer 4 also comprises, to each side of the axis of symmetry X–X' and close to the posterior part 14, two openings 15 through which the plate 1 can be seen.

The sole plate described hereinabove can be fitted to a horseshoe by means of three screws one of which is first inserted into passage 11 to go through hole 12 and screw into the matching part of the shoe. This fitting should preferably be carried out before the shoe is fitted to the hoof as this will allow the sole plate to be correctly adapted to the shoe according to the latter's shape and size after which the joined bodies can be turned over and holes drilled into plate 1 in the location of openings 15 in such manner that they will coincide with the posterior holes of the shoe.

After adapting the shoe, the sole plate can thus be fitted and solidly secured to the shoe using the anterior screw and the two posterior screws, all of which, together with the plate, ensure secure and rugged attachment of the sole plate.

Figure 1:
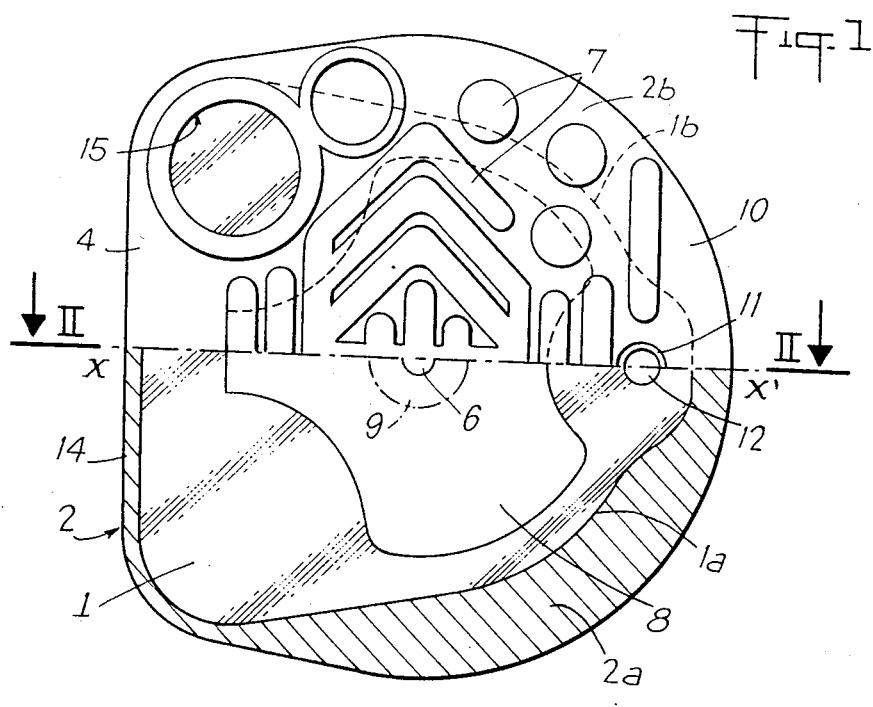
FIG. 1 is a half plan view, half cutaway view of a sole plate according to the invention.

It will be noticed in looking over FIG. 1, that the plate 1 has a shape in plan view, as previously remarked, which is smaller than that of the final sole plate. In particular, the plate is shaped so that the anterior edges 1a and 1b are located well behind the periphery of the one-piece casing 2. This fulfills two purposes: firstly, zones 2a and 2b of the casing, located to each side of the axis X–X', are made entirely of deformable material, allowing the heads of the shoe-attaching nails to be embedded if need be, so that they will not be in contact with the plate 1; secondly, zones 2a and 2b afford a possibility of cutting or clipping to adapt the contour of the sole plate to the shape of the corresponding shoe which itself conforms to the shape of the hoof.

The sole plate can be utilized in the condition just described since the casing 2 is made all of one piece and has strong adherence features with respect to the reinforcement or plate 1.

Alternatively however, the sole plate can be inflated beforehand by inserting into the bulb 5, which is an inflating valve, a needle, being for example a hollow one of the hypodermic type, being an extension of an inflating device. Such a needle would be inserted in the direction of arrow $f_1$ so that it also goes through the material filling hole 6 and penetrates into the interface where it hits the flap 9. This gives the operator a physical feedback indicating that he has accurately placed the needle point relative to the non-adhering interface between layer 4 and plate 1. The operator will thus not be inclined to continue his motion in the direction of arrow $f_1$, which would drive the needle into the material making up layer 4.

At this point it is possible to deliver a load of compressed fluid which thus enters the interface corresponding to zone 8. As a result, a pocket forms, or a chamber or a cushion 16 of compressed fluid, which adopts the form depicted in FIG. 3. The reason for this is that, since the plate 1 represents an undeformable reinforcement part, the fluid pressure brings about inflation of the required part of layer 4, namely that corresponding to zone 8. Inflation can easily be adapted to the desired pressure, whereafter the needle is withdrawn from bulb 5, the material of the latter naturally springing back to close the needle hole. What results is an automatic sealing of the cushion 16, trapping the compressed fluid therein.

The automatic sealing can be enhanced by providing plate 1 with a dished part 6a around hole 6, as illustrated in FIG. 4. Dished part 6a can be formed for example, as a truncated-cone-shaped depression jutting out from the face of the plate corresponding to layer 3. The small base of this depression corresponds with the opening of hole 6 and the large base is situated in the plane of the face of plate 1 corresponding to layer 4. In this case, the substance of the material constituting bulb 5 entirely fills the depression.

After inflating cushion 16, as previously described, the expanding pressure stresses the material filling the dished part and tends to push it up towards hole 6. The truncated conical shape of the dished part subjects the material to a peripheral compression, following a centripetal radial path, thus completing the sealing of the hole punched into the material when the inflating needle was introduced.

This tendency to seal up is further promoted when cushion 16 is subjected to a crushing or flattening force as the hoof bears down upon or impacts the ground.

Given that layer 4 adheres solidly to plate 1 all around the periphery of zone 8, any stepping, trotting, galloping or jumping action by the horse will bring about, exclusively at the moment of hoof-to-ground pressure or impact, a reduction in volume of chamber 16. This raises the pressure of the fluid in the chamber or cushion, since the fluid cannot escape due to the one-piece construction of the sole plate and the intimate adherence of the material making up casing 2 with itself as well as with plate 1.

Thus, in addition to the shock or vibration damping or filtering effect provided by the cushion, there is also provided, as the horse transfers its load and relieves the corresponding hoof, a restitution of the stored work, which contributes to lessening the stepping work of the horse and thereby to significantly reducing its physical fatigue.

Figure 3:
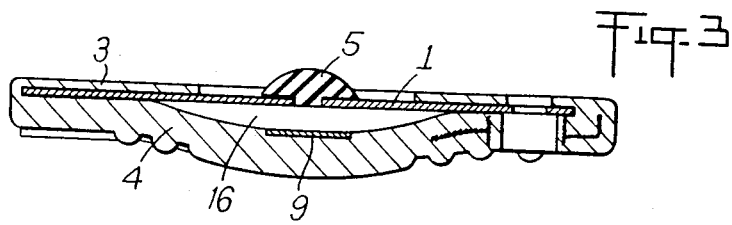
FIG. 3 is a cross-sectional elevation like that of FIG. 2, except depicting the sole plate in a different use configuration.

As shown in FIGS. 2 and 3, layer 4 can be strengthened towards the anterior part 10 of the sole plate by including therein a reinforcement 17 consisting, for example, of a strip of fabric built up on a base of material known by the commercial name Kevlar. Said reinforcement 17 will preferably be placed in the substance of layer 4 and is given a bend 18 following and somewhat withdrawn from the peripheral edge of anterior part 10. Preferably also, reinforcement 17 includes a strip 19 surrounding passage 11.

In one preferred embodiment, such as that illustrated in FIG. 5, the material of layers 3 and 4 is reinforced rubber. Moreover, layer 3 is made to extend over the entire top surface of plate 1. In this case, the bulb 5 protrudes from layer 3 and its substance merges smoothly with that of layer 3, as is schematically depicted by the shading diagonals near or about the dot-dashed lines T marking the periphery of the merging zone between the different-Shore-hardness materials of layers 3 and bulb 5.

As shown in FIG. 5, the flap 9 can be made of a sheet of deformable (elastic) but puncture-proof material made to adhere to layer 4 in the area of the latter's surface corresponding to the zone 8 not adhering to plate 1. Such a flap can consist for example of a metallic strip whose side facing layer 4 has been specially treated so that, during molding, said strip will bond with the substance of layer 4.

Such a flap 9a plays the same role as the flap described hereinbefore. However, as the broken lines of FIG. 5 indicate, following inflation and deformation of the pneumatic pad or cushion 16, flap 9a stretches and follows the deformation or stretching of layer 4. In this example and at this time, the flap thus advantageously constitutes a protective barrier against puncturing.

In accordance with another embodiment of the invention, illustrated in FIGS. 6 and 7, the bulb 5 is part of a reinforced section 20 rising from layer 3 as of the posterior part 14 of the sole plate. Reinforced section 20 is made entirely of the same material as valve or bulb 5 and is given a thickness and configuration enabling it to cooperate with the frog and/or sole of the horse's hoof. This reinforced section, in the form of a pad, can thus fulfill a reinforcing function protecting plate 1 against deformation, or an orthopedic function, by acting as a cushion resisting a local collapsing of the frog and/or sole.

In this sense, the profile and plan outlines drawn in FIGS. 6 and 7 must be understood to be completely arbitrary. They are given merely for purposes of general illustration. In fact, the overall configuration of this pad 20 will be defined in each case according to the specific function assigned thereto.

In every case however, the reinforced section 20 is provided with a physical locating means 21, such as a protrusion in line with hole 6, for the purpose of identifying the exact spot for insertion of an inflating needle into the air valve, which is now integral with the pad 20.

It is further evidenced from FIGS. 6 and 7 that in the case at hand the substances making up layer 4 and reinforced section or pad 20 all smoothly merge together, both at the periphery of the posterior part 14 and in the area of joining with top layer 3.

FIG. 8 illustrates still another embodiment of the invention according to which the wear layer 4 is associated with a mass 22 of cellular material with open or closed cells provided in the location of the non-adhering surface with respect to zone 8 of plate 1. Mass 22 is thus provided in the form of a cushion contributing a permanent localized swelling of layer 4. Cushion 22 is similarly non-adhering with respect to zone 8. It is thus possible to increase the overall volume of said cushion by injecting compressed fluid into the non-adhering interface as described in relation with the previous examples. Said cushion 22 can fill a space equal to or smaller than zone 8 and can be provided with a flap such as 9 or 9a.

A sole plate as described in the foregoing can be fabricated by means of the following procedure:

Start by cutting out a plate 1 and sand-blasting both faces, as well as the periphery of the hole 6, previously provided therein along with hole 12.

Having thus prepared the plate, cover one side thereof with a mask defining the pattern of zone 8. This mask can be attached in a number of different suitable known ways and can even consist of the flap 9 or 9a itself. As the case may be, the mask is placed on the corresponding surface of the plate after first closing off the opening of hole 6 with a temporary shield.

Next, adhesively treat the plate by coating or spraying the outside surface of both faces and the surrounding edge with a product for bonding with the substance of casing 2.

In one alternative, the mask is removed at this point and the plate thus prepared is laid in a mold in the bottom of which have previously been laid the raw material which will subsequently form layer 4 and, thereupon, the flap 9 or 9a, which may or may not have been pretreated. The plate is laid in the mold with the face of the plate that had been masked facing the bottom of the mold and bearing on the raw material layer previously placed in the mold.

For the alternative embodiment according to FIGS. 6 and 7, the mold must be topped off with a mass of raw material with the same characteristics as that initially laid in the bottom of the mold, designed to form layer 3. The mold is then further topped off with a different raw material responsible for the formation later on of the integral reinforced section or pad 20 and inflating valve 5.

Thereafter, close or clamp the mold and heat it as required to bring about the vulcanization of the material therein. Following vulcanization, unclamp or open the mold and take out the sole plate according to the invention.

The invention should not be construed as being limited to the specific examples described herein and illustrated by the drawings, as various modifications not mentioned may still be made by someone skilled in the art, without departing from the scope of the invention as defined by the following claims.

I claim:

1. A sole plate for attachment to the hoof of a horse by means of plural screws, which plate comprises:
   (a) a reinforcement frame in the configuration of a plate;
   (b) a casing integrally formed of a material having a Shore hardness in the range of 45 to 100, the casing enclosing the frame and being defined by a top layer extending at least partially across and being adhered to the top surface of the frame, and a bottom layer including an outer wear surface and an inner surface, the inner surface being partially adhered to the bottom surface of the frame, with the unadhered portions of the inner and bottom surfaces collectively defining a central zone, the bottom layer being provided with a plurality of openings through which the bottom surface of the frame may be observed and screws may be engaged;
   (c) a hole formed in the frame for permitting access to the central zone; and
   (d) a valve closing the hole and formed of a resilient and self-sealing material having a Shore hardness in the range of 25 to 55, the valve being configured to permit the insertion of a needle therethrough for injecting compressed fluid into the central zone and inflating the portion of the bottom layer corresponding to the adhered portion of its inner surface.

2. The sole plate of claim 1 further including a load of compressed fluid disposed within the central zone.

3. The sole plate of claim 1 further including a cushion formed of resilient material disposed within the central zone.

4. The sole plate of claim 1 wherein the top layer extends across the entire top surface of the frame and the valve is integrally formed with the top layer.

5. The sole plate of claim 4 wherein the top layer is configured to define a reinforced section extending from the posterior end of the sole plate for cooperative engagement with the frog of a horse hoof, and further includes means for identifying the physical location of the valve.

6. The sole plate of claim 5 wherein the material defining the valve is of natural rubber.

7. The sole plate of claim 1 wherein the bottom layer further includes reinforcing fabric embedded therein.

8. The sole plate of claim 1 wherein the frame includes anterior edges spaced inwardly from the adjacent corresponding exterior edges of the casing.

9. A sole plate for attachment to the hoof of a horse by means of plural screws, which plate comprises:
   (a) a reinforcement frame in the configuration of a plate;
   (b) a casing integrally formed of a material having a Shore hardness in the range of 45 to 100, the casing enclosing the frame and being defined by a top layer extending at least partially across and being adhered to the top surface of the frame, and a bottom layer including an outer wear surface and an inner surface, the inner surface being partially adhered to the bottom surface of the frame, with the unadhered portions of the inner and bottom surfaces collectively defining a central zone, the bottom layer being provided with a plurality of openings through which the bottom surface of the frame may be observed and screws may be engaged;
   (c) a hole formed in the frame for permitting access to the central zone;
   (d) a valve closing the hole and formed of a resilient and self-sealing material having a Shore hardness in the range of 25 to 55, the valve being configured to permit the insertion of a needle therethrough for injecting compressed fluid into the central zone and inflating the portion of the bottom layer corresponding to the unadhered portion of its inner surface; and
   (e) a flap formed of puncture resistant material disposed in the central zone between the inner and bottom surfaces for covering the hole, wherein the area of the flap exceeds the area of the hole.

10. The sole plate of claim 9 wherein the flap is elastic and adhered to the inner surface of the bottom layer.

11. A sole plate for attachment to the hoof of a horse by means of plural screws, which plate comprises:
    (a) a reinforcement frame in the configuration of a plate;
    (b) a casing integrally formed of a material having a Shore hardness in the range of 45 to 100, the casing enclosing the frame and being defined by a top layer extending at partially across and being adhered to the top surface of the frame, and a bottom layer including an outer wear surface and an inner surface, the inner surface being partially adhered to the bottom surface of the frame, with the unadhered portions of the inner and bottom surfaces collectively defining a central zone, the bottom layer being provided with a plurality of openings through which the bottom surface of the frame may be observed and screws may be engaged;
    (c) a hole formed in the frame for permitting access to the central zone;
    (d) a valve closing the hole and formed of a resilient and self-sealing material having a Shore hardness in the range of 25 to 55, the valve being configured to permit the insertion of needle therethrough for injecting compressed fluid into the central zone and inflating the portion of the bottom layer corresponding to the unadhered portion of its inner surface; and
    (e) the reinforcement frame being provided with a dished portion having a truncated cone configuration protruding from the top surface of the frame, with the dished portion being filled with the material forming the valve.

* * * * *